United States Patent Office 3,468,884
Patented Sept. 23, 1969

3,468,884
5-AMINOOXADIAZINES
Aldo J. Crovetti, Lake Forest, and Anne Mary Von Esch,
North Chicago, Ill., assignors to Abbott Laboratories,
North Chicago, Ill., a corporation of Illinois
No Drawing. Filed Aug. 15, 1966, Ser. No. 572,288
Int. Cl. C07d 99/02, 99/06; A01n 9/28
U.S. Cl. 260—244                     11 Claims

ABSTRACT OF THE DISCLOSURE

Compounds of the formula

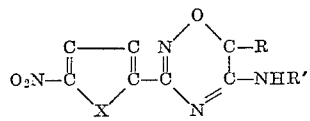

wherein X represents oxygen or sulfur, R' represents hydrogen or alkyl and R represents hydrogen, methyl, or acyl such as formyl, acetyl, propionyl, butyryl, valeryl, or benzoyl and which are useful antibacterial or antifungal agents.

---

This invention is concerned with compounds of the formula

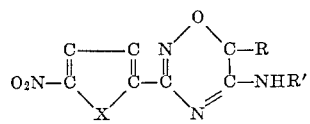

and the method for their preparation. In this and succeeding formulas, X represents oxygen or sulfur, R represents hydrogen or alkyl and R' represents hydrogen, methyl, or acyl such as formyl, acetyl, propionyl, butyryl, valeryl, or benzoyl. The term "alkyl" includes the straight and branched alkyl radicals containing from one to sixteen carbon atoms, inclusively.

These novel compounds are active antibacterial and antifungal agents, and have been found to be active agents against *Trichomonas vaginalis* and foetus in vitro and have also shown in vivo activity in mice against *T. vaginalis* or *E. coli*. The compounds may be dispersed in an inert solid or in a liquid and applied as a dust or spray. In a typical application, the compound of Formula A, wherein X was oxygen, R was hydrogen and R' was acetyl, inhibited the growth of the above-named organisms when employed as an aqueous composition in a concentration of 25 parts per million.

The compounds of the present invention wherein X is oxygen are prepared by the reaction of a haloalkyloxadiazole (the preparation of which will hereinafter be described in detail) with ammonia or methylamine in a suitable polar solvent such as ammonia, dimethylformamide, dimethylacetamide, 1,2-dimethoxyethane, or aromatic solvents such as benzene and toluene. The reaction is conducted at temperatures ranging between —65° C. and 25° C. The solution is then filtered to separate the aminooxadiazine product. To prepare the acyl compounds, the aminooxadiazine, prepared as previously described, is acylated with an acyl anhydride acting as a chemical reagent or as a solvent, or, alternatively, in pyridine. The reaction is conducted at from 40° C. to 90° C: for 1 to 36 hours. The reaction mixture is then decomposed in ice water and the final product is isolated by filtration. The product may be purified from suitable organic solvents such as, for example, ethyl alcohol, nitromethane, dimethylformamide and water, methyl Cellosolve, and dimethylsulfoxide and water.

Referring now to the haloalkyloxadiazole starting materials which can be depicted by the formula

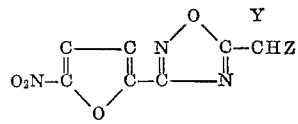

wherein Y is hydrogen or alkyl and Z is halogen; these compounds can readily be prepared by heating at or above the melting point a compound of the formula

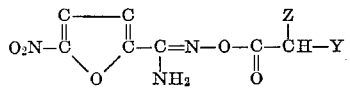

The compound thus formed is then crystallized from a suitable solvent such as ethanol, nitromethane, or acetonitrile. Alternatively, if desired, equimolar mounts of 5-nitro-2-furylamidoxime, prepared by the method disclosed in U.S. Patent 3,097,214, issued July 9, 1963, and a compound of the formula

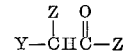

wherein Z, the halogen, is preferably chlorine or bromine, and wherein each Z may be alike or dissimilar, may be refluxed in an inert solvent such as toluene, xylene, dimethylformamide, or benzene in the presence of a hydrohalide acceptor such as pyridine, potassium carbonate, or triethylamine or in acetic acid without acid acceptor to form the intermediate compound designated in Formula C above in situ and without actually isolating said intermediate continuing the reaction at reflux temperature to close the ring. The reaction mixture is then concentrated and the residue recrystallized to obtain the desired oxadiazole as a crystalline solid.

The aminooxadiazine compounds of the present invention wherein X is sulfur can be prepared by suspending 5-nitro-2-thiophene carboxamidoxime, prepared by the method of Bercot-Vatteroni, Ann. Chim., 7, 303–307, 1962, in chloracetylchloride. The mixture is then heated at reflux and the excess acid chloride removed by distillation. A solvent such as n-butanol is added, and the mixture is refluxed overnight after which it is filtered and cooled. The 5-chloromethyl-3-(5-nitro-2-thienyl-1,2,4-oxadiazole which crystallizes is then treated with ammonia to obtain the aminooxadiazine. To prepare the acyl compounds, the aminooxadiazine is acylated with an acyl anhydride.

The invention is further illustrated by the following examples which describe the specific processes used to prepare representative compounds.

Example 1.—5-amino-3-(5-nitro-2-furyl)-
6H-1,2,4-oxadiazine 15 g. of 3-(5-nitro-2-furyl)-5-chloromethyl-1,2,4-oxadiazole was suspended in 100 ml. liquid ammonia precooled to —65° C. (by use of acetone-Dry Ice bath), and stirred at this temperature for two hours. The suspension was then allowed to slowly reach the temperature of liquid ammonia. The resultant compound was filtered, dried, and then washed thoroughly with water. A yield of 90% of the bright yellow compound (M.P. 220°–222° C. (dec.)) was obtained. This material is of satisfactory purity for most uses. However, if recrystallization is desired, the dried product can be crystallized from nitromethane, dimethylformamide and water or methyl Cellosolve and water.

Example 2.—5-amino-3-(5-nitro-2-furyl)-6-methyl-
1,2,4-oxadiazine

A suspension of 4.5 g. of 3-(5-nitro-2-furyl)-5-α-bromoethyl-1,2,4-oxadiazole in 25 ml. of liquid ammonia was made (no external cooling) and stirred. The ammonia was allowed to evaporate. When the ammonia completely disappeared, the residue was washed with water to remove ammonium bromide. The residue was then dried and recrystallized from boiling nitromethane. The compound is a bright yellow solid melting at 270° C. (dec.).

Example 3.—5-methylamino-3-(5-nitro-2-furyl)-6H-1,2,4-oxadiazine

A suspension of 18.4 g. of 3-(5-nitro-2-furyl)-5-chloromethyl-1,2,4-oxadiazole in 100 ml. of benzene was made. 2 ml. of dimethylformamide and 5.0 g. of methyl amine were added. The preparation was then shaken in a closed container at room temperature overnight.

The solution was subsequently filtered, yielding a brown solid. Recrystallization with ethanol as the solvent yielded 1.0 g. of a yellow solid, M.P. 222°–224° C.

Example 4.—5-butyramido-3-(5-nitro-2-furyl)-6H-1,2,4-oxadiazine

To a solution of 4.2 g. of 5-amino-3-(5-nitro-2-furyl)-6H-1,2,4-oxadiazine in 25 ml. of pyridine was added 5.0 ml. of butyric anhydride. The preparation was then heated at 55° C. for 24 hours, after which it was poured on ice. A cream-colored solid precipitated out, yielding 3.4 g. of the desired product, M.P. 158°–161° C. (dec.).

Example 5.—5-chloromethyl-3-(5-nitro-2-thienyl)-1,2,4-oxadiazole 10 gm. of 5-nitro-2-thiophene carboxamidoxime was suspended in 30 ml. of chloroacetylchloride. The suspension was heated at reflux for two hours, and the excess acid chloride was then removed by distillation. Added and refluxed overnight was 20 ml. of n-butanol. The solution was then filtered and cooled, and the product crystallized out. M.P. 72°–74° C.

Analysis.—Calculated for $C_7H_4ClN_3O_3S$: C, 34.24%; H, 1.64%; N, 17.11%. Found: C, 33.93%; H, 1.75%; N, 17.28%.

Example 6.—5-amino-3-(5-nitro-2-thienyl)-6H-1,2,4-oxadiazine

A suspension of 2.0 g. of 5-chloromethyl-3-(5-nitro-2-thienyl)-1,2,4-oxadiazole in 5 ml. of liquid ammonia was made. The liquid ammonia evaporated, leaving a green residue. The residue was water washed, dried, and recrystallized from boiling nitromethane. The product obtained had a melting point of 228°–230° C. (dec.) and was a brilliant yellow.

Analysis.—Calculated for $C_7H_6N_4O_3S$: C, 37.16%; H, 2.67%; N, 24.77%. Found: C, 37.18%; H, 2.69%; N, 24.79%.

Example 7.—5-acetamido-3-(5-nitro-2-thienyl)-6H-1,2,4-oxadiazine

Suspended in 4.0 ml. of acetic anhydride was 1.0 g. of the starting amine, prepared by the method illustrated in Examples 5 and 6. The suspension was heated at 55° C. for 24 hours.

A cream-colored compound crystallized from the acetic anhydride. The compound was filtered and then recrystallized from boiling ethanol, M.P. 193°–194° C. (dec.).

Analysis.—Calculated for $C_9H_8N_4O_5S$: C, 40.30%; H, 3.00%; N, 20.89%. Found: C, 40.44%; H, 3.04%; N, 20.97%.

Using the methods exemplified, the following compounds of the present invention were made.

OXADIAZINES

| Ex. | R | R' | M.P. | Solvents For Recrystallization | | Calculated | | | Found | |
|---|---|---|---|---|---|---|---|---|---|---|
| | | | | | | C | H | N | C | H | N |
| 8 | H | H | 220°–222° C. (dec.) | Nitromethane | $C_7H_6N_4O_4$ | 40.00 | 2.88 | 26.66 | 40.05 | 2.93 | 26.82 |
| 9 | H | $CH_3$ | 220°–224° C. (dec.) | Ethanol | $C_8H_8N_4O_4$ | 42.86 | 3.60 | 24.99 | 42.78 | 3.60 | 24.87 |
| 10 | $CH_3$ | H | 270° C. (dec.) | Nitromethane | $C_8H_8N_4O_4$ | 42.86 | 3.60 | 24.99 | 42.81 | 3.61 | 24.84 |
| 11 | $-CH_2CH_3$ | H | 225°–227° C. (dec.) | Ethyl Acetate | $C_9H_{10}N_4O_4$ | 45.38 | 4.23 | 23.52 | 45.53 | 4.24 | 23.58 |
| 12 | $-C(CH_3)_2H$ | H | 198°–200° C. (dec.) | 12A Ethanol | $C_{10}H_{12}N_4O_4$ | 47.62 | 4.80 | 22.21 | 47.45 | 4.99 | 22.41 |
| 13 | $-5CH_2)_2CH_3$ | H | 212°–214° C. (dec.) | Nitromethane | $C_{10}H_{12}N_4O_4$ | 47.62 | 4.80 | 22.21 | 47.77 | 4.94 | 22.18 |
| 14 | $-5CH_2)_3CH_3$ | H | 186°–188° C. (dec.) | do | $C_{11}H_{14}N_4O_4$ | 49.62 | 5.30 | 21.04 | 49.80 | 5.40 | 20.75 |
| 15 | $-5CH_2)_5CH_3$ | H | 158°–160° C. (dec.) | do | $C_{17}H_{26}N_4O_4$ | 58.26 | 7.48 | 15.99 | 58.26 | 7.57 | 16.00 |
| 16 | $-5CH_2)_{13}CH_3$ | H | 143°–145° C. (dec.) | do | $C_{21}H_{34}N_4O_4$ | 62.04 | 8.43 | 13.78 | 96.29 | 8.60 | 13.82 |
| 17 | $-(5CH_2)_{15}CH_3$ | H | 138°–140° C. (dec.) | do | $C_{23}H_{38}N_4O_4$ | 63.56 | 8.82 | 12.89 | 63.89 | 8.78 | 12.87 |
| 18 | H | $-\overset{O}{\underset{\|}{C}}H$ | 182°–184° C. (dec.) | 3A Ethanol | $C_8H_6N_4O_5$ | 40.43 | 2.54 | 23.53 | 40.30 | 2.64 | 23.44 |
| 19 | H | $-\overset{O}{\underset{\|}{C}}CH_3$ | 202°–204° C. (dec.) | do | $C_9H_8N_4O_5$ | 42.86 | 3.20 | 22.22 | 43.70 | 3.30 | 2.56 |
| 20 | H | $-\overset{O}{\underset{\|}{C}}CH_2CH_3$ | 195°–197° C. (dec.) | do | $C_{10}H_{10}N_4O_5$ | 45.11 | 3.79 | 21.05 | 45.16 | 3.51 | 21.06 |
| 21 | H | $-\overset{O}{\underset{\|}{C}}CH_2)_2CH_3$ | 158°–161° C. (dec.) | do | $C_{11}H_{12}N_4O_5$ | 47.14 | 4.32 | 19.99 | 47.07 | 4.15 | 19.87 |
| 22 | H | $-\overset{O}{\underset{\|}{C}}CH_2)_3CH_3$ | 120°–123° C. (dec.) | do | $C_{12}H_{14}N_4O_5$ | 48.98 | 4.80 | 19.04 | 48.73 | 4.72 | 19.08 |
| 23 | H | $-\overset{O}{\underset{\|}{C}}-C_6H_5$ | 210°–211° C. (dec.) | do | $C_{14}H_{10}N_4O_5$ | 53.51 | 3.21 | 17.83 | 53.30 | 3.24 | 17.86 |
| 24 | $-CH_3$ | $-\overset{O}{\underset{\|}{C}}CH_3$ | 171°–173° C. (dec.) | do | $C_{10}H_{10}N_4O_5$ | 45.11 | 3.79 | 21.05 | 45.07 | 3.65 | 21.00 |
| 25 | $-CH_3$ | $\overset{O}{\underset{\|}{C}}CH_2CH_3$ | 171°–174° C. (dec.) | do | $C_{11}H_{12}N_4O_5$ | 47.14 | 4.32 | 19.99 | 47.17 | 4.31 | 19.81 |
| 26 | $-CH_2CH_3$ | $-\overset{O}{\underset{\|}{C}}CH_3$ | 140°–142° C. (dec.) | do | $C_{11}H_{12}N_4O_5$ | 47.14 | 4.32 | 19.99 | 47.22 | 4.64 | 19.93 |

While the invention has been illustrated by the foregoing examples, it will be apparent that various equivalent changes and modifications may be resorted to without departing from the spirit and scope thereof, and it is understood that such equivalent embodiments are intended to be included herein.

What is claimed is:
1. A compound of the formula

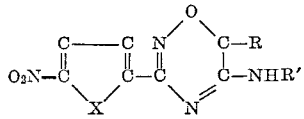

wherein X is selected from the group consisting of oxygen and sulfur; R is selected from the group consisting of hydrogen and alkyl of from 1 to 16 carbon atoms; and R' is selected from the group consisting of hydrogen, methyl, and lower alkanoyl or benzoyl.

2. A compound as claimed in claim 1 wherein X is oxygen.
3. A compound as claimed in claim 1 wherein X is sulfur.
4. A compound as claimed in claim 2 wherein R is hydrogen and R' is hydrogen.
5. A compound as claimed in claim 2 wherein R is hydrogen and R' is methyl.
6. A compound as claimed in claim 2 wherein R is hydrogen and R' is acetyl.
7. A compound as claimed in claim 2 wherein R is hydrogen and R' is propionyl.
8. A compound as claimed in claim 3 wherein R is hydrogen and R' is hydrogen.
9. A compound as claimed in claim 3 wherein R is hydrogen and R' is acetyl.
10. A method for the preparation of a compound of the formula

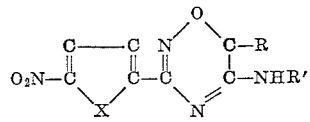

wherein X is selected from the group consisting of oxygen and sulfur; R is selected from the group consisting of hydrogen and alkyl of from 1 to 16 carbon atoms; and R' is selected from the group consisting of hydrogen, methyl, and lower alkanoyl or benzoyl; which comprises reacting a compound of the formula

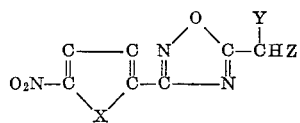

wherein X is as above indicated, Y is selected from the group consisting of hydrogen and alkyl of from 1 to 16 carbon atoms and Z is halogen, with an amination agent selected from the group consisting of ammonia and methylamine in a solvent selected from the group consisting of polar compounds and aromatic compounds, removing the excess amination agent, and reacting with an acyl anhydride.

11. A method for the preparation of a compound of the formula

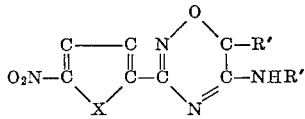

wherein X is selected from the group consisting of oxygen and sulfur, R is selected from the group consisting of hydrogen and alkyl of from 1 to 16 carbon atoms, and R' is selected from the group consisting of hydrogen and methyl, which comprises reacting a compound of the formula

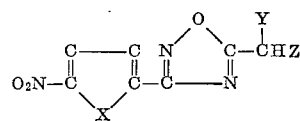

wherein X is as above indicated, Y is selected from the group consisting of hydrogen and alkyl of from 1 to 16 carbon atoms and Z is halogen, with an amination agent selected from the group consisting of ammonia and methylamine in a solvent selected from the group consisting of polar compounds and aromatic compounds.

References Cited

UNITED STATES PATENTS 3,397,201   8/1968   Trepanier _____ 260—244

HENRY R. JILES, Primary Examiner

R. T. BOND, Assistant Examiner

U.S. Cl. X.R.

424—248